United States Patent [19]

Smedberg et al.

[11] 4,255,102

[45] Mar. 10, 1981

[54] MACHINE FOR TREATMENT OF LIGNOCELLULOSE CONTAINING BOARD MATERIALS WITH GASEOUS AGENTS

[75] Inventors: Olle Smedberg; Kenneth Larsson, both of Oskarström, Sweden

[73] Assignee: Ry Aktiebolag, Oskarström, Sweden

[21] Appl. No.: 55,958

[22] Filed: Jul. 9, 1979

[30] Foreign Application Priority Data

Jul. 7, 1978 [SE] Sweden ............................... 7807641

[51] Int. Cl.[3] ............................................. A01J 21/00

[52] U.S. Cl. ..................................... 425/74; 425/210; 425/445; 425/446

[58] Field of Search .................. 425/73, 74, 210, 445, 425/446

[56] References Cited

U.S. PATENT DOCUMENTS

| | | | |
|---|---|---|---|
| 1,877,047 | 9/1932 | Piazza | 425/74 |
| 3,008,205 | 11/1961 | Blaies, Jr. | 264/83 |
| 3,832,107 | 8/1974 | Cox et al. | 425/73 |

*Primary Examiner*—Donald E. Czaja
*Assistant Examiner*—James R. Hall
*Attorney, Agent, or Firm*—Sherman & Shalloway

[57] ABSTRACT

A machine for treatment of board material with gaseous substances under the influence of negative pressure in which the upper zone of treatment applying the treating gas has a greater surface area applied to the board than the surface area of the lower negative pressure zone applied to the board opposite to the upper zone.

6 Claims, 1 Drawing Figure

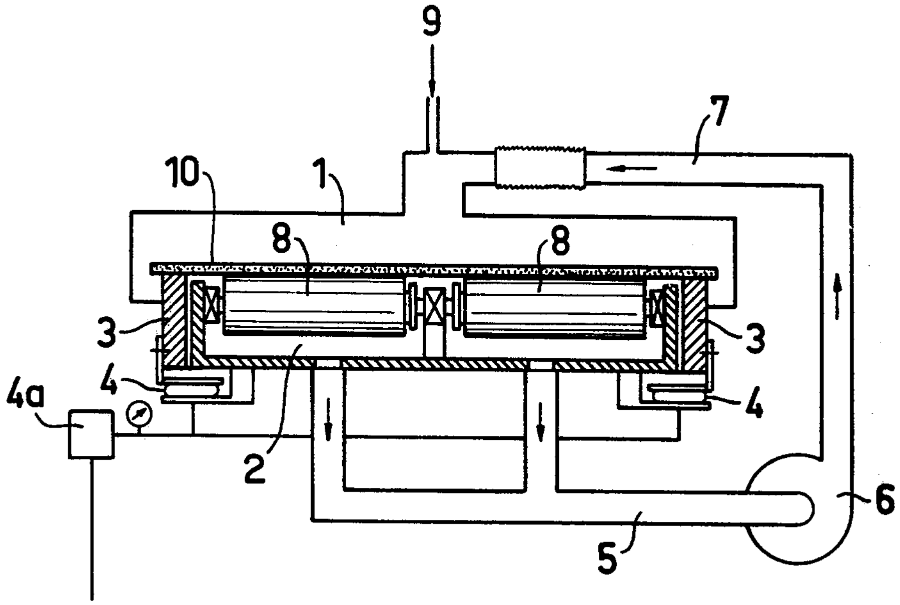
9
7
10
1
8
8
3
3
4
4
4a
2
6
5

MACHINE FOR TREATMENT OF LIGNOCELLULOSE CONTAINING BOARD MATERIALS WITH GASEOUS AGENTS

BACKGROUND OF THE INVENTION

1. Field of the Invention

This invention generally relates to machines for treating boards with a gaseous substance and, in particular, relates to a machine for continuously treating a board such as a particle board with a gaseous substance by drawing the gaseous substance through the board.

2. Description of the Prior Art

In our Swedish application No. 7701189-8, previously filed, it has been shown that apparently tight fiber materials have a certain permeability to gas sufficient for gaseous substances to be sucked right through the board by means of a negative pressure of the order of 0.4–0.9 negative pressure.

As is evident from the above-mentioned application, this makes possible a method of treatment for removing excessive formaldehyde from particle board by treatment with ammonia, this excess being bound in the form of hexamethylene tetramine. In treatment finally pressed boards are exposed to ammonia gas or a mixture of air and ammonia gas on one side at the same time as the opposite side of the board is exposed to a gas pressure being 40,000–90,000 Pascal lower than the pressure acting on the opposite side.

In this way, a particle board product is obtained which no longer gives off free formaldehyde, which is now a prerequisite for the use of the boards in apartments and the like due to the long-term unhealthy properties of the formaldehyde.

The negative pressure required for absorbing a certain amount of gas by time unit through a board is, of course, dependent on the permeability and thickness of the material. For certain particle boards, a negative pressure of several thousands mm water column is required. Already, one thousand mm water column gives, as is well known, a compressing strength of a thousand kg on one square meter, and, therefore, special measures must be taken to ensure a safe feeding through the suction zone.

SUMMARY OF THE INVENTION

The present invention relates to a machine for industrial continuous treatment of board materials, primarily particle board, with gaseous substances. A first treating zone applies the gaseous substance to a first surface area of the board. A second treating zone of negative pressure is applied to the opposite side of the board and opposing the first treating zone. The negative pressure is applied to a second surface of the second side of the board such that the second treating zone draws the gaseous substance from the first treating zone and through the board. The second surface area is less than the first surface area. Roller guides are provided in the second treating zone for guiding the board. The second treating zone is preferably defined by a sealing frame independently supported about the roller guide. In the preferred embodiment, the first treating zone applies the gaseous substance to the entire upper surface of the board, the edges of the board and a portion of the bottom surface of the board.

BRIEF DESCRIPTION OF THE DRAWING

In the drawing a preferred embodiment of a machine according to this invention, is shown schematically, illustrating a section perpendicular to the feed direction of boards through the machine.

DETAILED DESCRIPTION OF THE INVENTION

Referring to the drawing, a low pressure zone 2 is defined by a frame 3, which at high vacuum would bring a considerable friction against passing board material, represented as board 10. The drawing shows schematically additional elements included in the machine, i.e., a vacuum pump 6 and conduits 5 and 7 for circulation and a conduit 9 for supply of treating gas. The pump 6 provides a pressure differential between zone 2 and an upper chamber 1.

The frame 3 is carried by a number of compressed-air operated rollers or cylinders 4 fed from a compressor 4*a*, or the like, and is provided with a pressure which is limited to that pressure which is required to achieve a satisfactory sealing by the frame 3. The friction between the board 10 and the frame 3 resulting from the transportation of the boards through the machine can be made substantially constant in this way independently of the fact that the negative pressure in zone 2 varies from a 1,000 mm water column to a 9,000 mm water column. Of course the construction can also be adapted to still greater variations of the pressure difference.

Reference character 8 designates roller guides arranged in the low pressure zone 2 of the machine and intended for absorbing the main part of the compressing strain from the board 10 and the pressure acting on top thereof. It can thus be seen that when the pressure provided by the compressor 4*a* to the cylinders 4 is limited to the pressure required to achieve sealing, and the pressure required is not unduly high, that the frame 3 will absorb a minimal part of the compressing strain from the board 10. Thus, friction between the board 10 and the frame 3 will be minimized. The roller guides 8 are driven mechanically and provide a means for feeding consecutive boards after each other through the zone of treatment. In principle, the feeding is performed independently of the amount of the negative pressure.

Investigations have shown that most flat pressed board materials have a surface layer which is considerably less permeable than the interior portions of the intermediate plane of the board. The upper chamber 1 is therefore made, according to the invention, so that it encloses the edges of the board. In contrast, the frame 3 has - width that is smaller than the board width. In this way the treating gas will be drawn through the edges of the board by negative pressure in the low pressure zone 2. The interior width of the frame 3 can be made considerably smaller than the board width for a material with a great difference in permeability between the surface layer and intermediate plane. Thus, it has been found that it is possible to provide a frame 3 which defines a low pressure zone 2 which has an area at the surface of the board 10 which is less than the area of the board 10. Thus, the size of the frame is further reduced, further reducing the friction against the passing board material.

This design of the upper chamber has also the advantage that a possible leakage between the treated board 10 and the frame 3 of the negative pressure zone consists of treating gas and not of air, which is an advantage if, as is shown in the drawing, a closed system is used.

What is claimed is:

1. A machine for continuous treatment of a particle board having a first side and a second side and an edge defined between the first and second sides wherein a gaseous substance is applied to the board, said machine comprising:

(a) a first treating zone for applying the gaseous substance to a first surface area of the board; and (b) a second treating zone opposed to said first treating zone for applying a negative pressure to a second surface area, said second treating zone drawing the gaseous substance from the first treating zone and through the board wherein the second surface area is less than the first surface area.

2. The machine of claim 1 wherein a roller guide is provided in the second zone for continuously guiding the board through the second zone.

3. The machine of claims 1 or 2 wherein the second surface area is confined to the second side and the second zone is defined by a sealing frame in contact with the second side of the board and further including means for independently supporting the sealing frame.

4. The machine of claim 3 wherein the first treating zone applies the gaseous substance to the entire first side of the board and to the edges of the board.

5. The machine of claim 4 wherein the first treating zone further applies the gaseous substance to a peripheral surface area of the second side of the board.

6. The machine of claim 3 wherein a means for applying the negative pressure to the second surface area extracts gas comprising air and the gaseous substance from the second treating zone and provides a portion of the gas extracted from the second treating zone to the first treating zone.

* * * * *